Sept. 6, 1938.  A. LEENAARDS  2,129,330
METHOD OF MAKING SPOT CAPS
Filed June 20, 1934
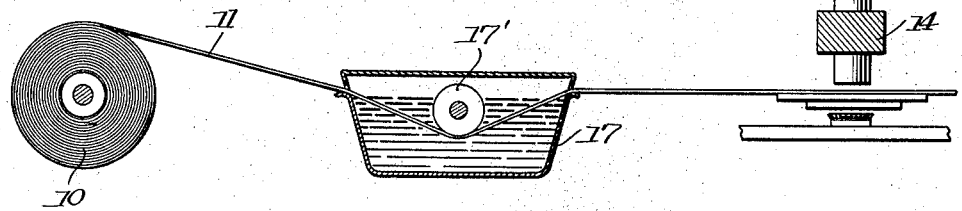
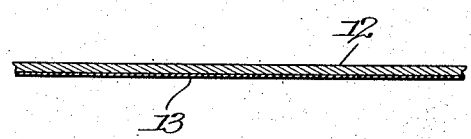
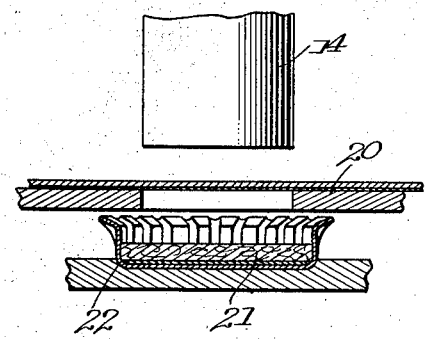
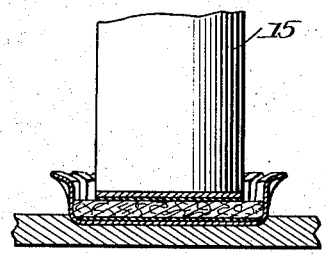
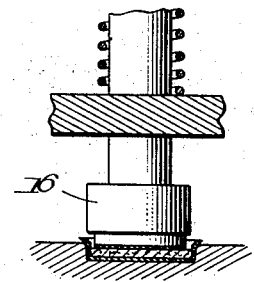
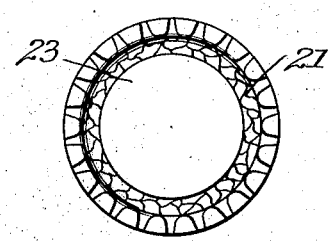
Inventor
Antoine Leenaards.
By Cushman, Darby & Cushman
Attorneys Patented Sept. 6, 1938

2,129,330

UNITED STATES PATENT OFFICE 2,129,330

METHOD OF MAKING SPOT CAPS

Antoine Leenaards, Antwerp, Belgium, assignor to Crown Cork & Seal Company, Inc., Baltimore, Md., a corporation of New York Application June 20, 1934, Serial No. 731,563

13 Claims. (Cl. 113—80)

The present invention relates to a method of making spot caps, particularly caps of the crown or crimp type. Such caps comprise a metal shell having a cushion liner secured to the bottom of the shell, and a facing of less diameter than the cushion liner superposed thereon and adhesively united to the liner.

In the manufacture of caps of this character, strip spotting material consisting of a layer of foil, for example, having on its undersurface a layer of adhesive, is continuously fed to a punching instrumentality and the spots are successively at a high rate of speed punched from the strip material and applied to a progressively presented series or row of shells each having a cushion liner therein.

Usually the adhesive layer is thermoplastic and it is customary to heat either the cushion shell assembly or the cutting punch so that the normally non-tacky thermoplastic adhesive is rendered tacky, whereby it will initially adhere to the cushion liner as soon as deposited and remain in centered position thereon during subsequent operations.

The shell-cushion-spot assembly is then subjected to a pressure plunger which is usually heated and which presses the spot into permanent contact with the liner and assures that the union of the spot and liner will be coextensive with the area of the spot.

Following this latter operation, the cushion-shell-spot assembly is generally submitted to a continuing pressure on a moving pressure dial where the assembly is further compressed together and the spotting adhesive, and in some cases, the adhesive between the cushion and shell are permitted to set.

This procedure is satisfactory, but under some conditions may present some difficulties due to the spot sticking to the punching dies or the pressure plunger; also, the spot has a tendency to, at times, move out of centered position upon withdrawal of the punching die or the pressure plunger due to imperfect softening of the adhesive.

With the present invention, I render the adhesive layer tacky, i. e., instantly adherent before the strip of spotting material is presented to the punching instrumentality. I also provide on the strip material a lubricant for the punching operation so that clean cut spots are produced, and thereby preventing the formation of any adhesive film upon the punching dies or the pressure plunger. In this manner, the spot is so affixed to the cushion liner at the punching operation as to retain its centered position for contact with the pressure plunger and, moreover, any tendency of the spots to stick to the cutting or pressing instrumentalities is completely avoided.

Briefly stated, the present invention comprises passing the strip spotting material through a water bath which preferably has such a temperature maintained that the strip spotting material emerges with the adhesive in tacky, adhesive condition, and with a thin film of the water which will act as a lubricant for the punch. By a lubricating action, I mean that the punching die cuts through the spot material cleanly and the adhesive is prevented by the moistening film or lubricant from coating the punch. Hence, the punch will not become sticky and prevent the proper application of the spot to the cushion liner.

While the water film is relatively negligible in quantity, it has the property of lubricating the punch with respect to its action upon the strip material and preventing the collection of adhesive upon the movable and fixed dies of the punch such as would cause sticking of the strip material or the spot to the punch dies.

The punching instrumentality may be such that the use of the usual pressure plunger after the punch may be eliminated. That is, the punch will deposit the spot upon the cushion liner and adhesively unite the two so that the spot is firmly and permanently affixed to the liner and the adhesive union is coextensive with the area of the spot.

However, a pressure plunger will usually be employed after the punch for permanently affixing the spot to the liner. The pressure plunger may be also cold, although if the adhesive tends to harden or if the film of moisture on the foil is objectionable, a heated plunger may be employed having a temperature to maintain the adhesive tacky and which, combined with the pressure, will vaporize any moisture present.

The caps are then passed through a movable pressure dial in which the crown, cushion liner and spot are compressed together for a suitable time period. This pressure dial may initially during its movement have a raised temperature to set certain types of adhesives and so that in combination with the pressure, any moisture present will be vaporized. In some cases, the pressure plunger will be omitted and the punching instrumentality and pressure dial alone employed to produce the spot cap.

Referring to the drawing:

Figure 1 is a diagrammatic view showing a roll of strip spotting material with the strip continuously passing through a heated bath and presented to the spot punch.

Figure 2 is a sectional view of the strip spotting material.

Figure 3 is a sectional view illustrating, by representation, the punch.

Figure 4 is a sectional view illustrating, by representation, the pressure plunger.

Figure 5 is a sectional view illustrating, by representation, one of the pressure devices on the rotating dial for receiving a multiplicity of cap assemblies and showing a cap in position and compressed; and Figure 6 is a bottom or inside view of a spot crown.

The spotting material of this invention will preferably be employed in the form of rolls 10 of relatively narrow strip spotting material 11 as shown in Figure 2 comprising a facing layer of metal foil 12 such as tin foil or aluminum foil or varnished paper and provided on its undersurface with an adhesive coating 13, preferably of a thermoplastic adhesive, such as gutta percha, gutta percha composition, or a cellulose derivative adhesive, of the order of those described in the United States patents to Albin H. Warth, 1,899,782 Feb. 28, 1933, 1,899,783 Feb. 28, 1933 and 1,956,481 Apr. 24, 1934. In some cases an adhesive layer 13 is employed which is rendered tacky by means of water or other suitable solvent. Such adhesives are well known commercially.

The punch 14 pressure plunger 15 and the plunger 16 (Fig. 5) of a moving or rotating pressure dial are all conventional.

The strip material 11 is moved through a tank 17, under a roll or guide 17', as shown in Figure 1, and is thus immersed during its travel in the water contained in said tank. The water is heated to a temperature sufficient to reduce the layer 13 from its normally non-tacky condition to a condition of adhesiveness or tackiness. Of course, the temperature will be controlled as will also the speed of movement of the strip through the bath in accordance with the nature of the adhesive or the character of the bath employed. If the adhesive be one rendered tacky by contact with moisture, the bath may be cold.

Preferably, I employ a water bath for the reason that the water is chemically inert with respect to the strip material 1. e., does not chemically change the nature of the adhesive and also because a relatively slight film of water will collect on the top of the foil and act as a lubricant in permitting the punch 14 to cut out spots from the strip material. Instead of water any suitable bath may be used, or the tank 17 may be a steam chamber.

The punch 14 will be reciprocated at a high rate of speed so that the number of spots punched per minute is considerable. The moisture film will not only act as a punch lubricant, but will also act as a protecting film to prevent adhesive collecting upon the punching dies 19 and 20. At each punching operation, a clean spot will be formed and be positively positioned upon the cushion layer or liner 21 of cork or cork composition which is disposed in the metal shell 22. The liner is united to the shell preferably before the cap is presented with a spot, but, in some cases, a cold hardened or heat hardened adhesive is used which is permitted to set in the pressure dial 16.

The punch 14, as stated, is operated in unheated condition and since the spotting material is presented to the punch with its layer 13 in optimum tacky, or adhesive state, the cutting out of the spot and its positioning in contact with the cushion liner by the punch will serve to unite the spot to the surface of the liner.

A succession of caps is passed at a high rate of speed beneath the punch 14 and each cap will have a spot positioned or deposited upon its cushion liner as just described.

The succession of caps is moved from the punch 14 to the pressure plunger 15, as shown in Figure 4. The purpose of this plunger 15 is to assure that the spot will be permanently fixed to the cushion liner 21 throughout the area of the spot, thereby overcoming any lack of contact of the spot with the cushion liner which may obtain as a result of the punching and depositing operation described in connection with Figure 3. If desired, the plunger 15 may be heated so that the pressure and temperature will result in vaporizing any moisture if the same should be objectionable or maintain the adhesive tacky should it tend to harden.

Following the treatment with the pressure plunger 15, the assembled spot crown is usually passed to a moving or rotating pressure dial one plunger 16 of which is shown in Fig. 5, where the shell, cushion and spot are compressed together for a suitable period in order to assure the complete union of the several parts of the cap. This utilization of the pressure dial in the present operation will also serve to unite the liner and shell as where the adhesive between the two (a heat hardened or cold hardened adhesive) has not set. During movement in the pressure dial, the adhesive or adhesives are allowed to set, the pressure dial being cold or heated as required during a portion or all of its movement.

In order that the method of the present invention and its various modifications may be understood, I will recite four operations which can be employed for the manufacture of caps.

Thus, the strip spotting material will be treated in the heated bath in tank 17, then subjected to the non-heated punch 14, then to the non-heated pressure plunger 15, and finally the assembled spot crown is subjected to pressure in non-heated pressure dial 16.

Again, the operations just described may be utilized and the pressure plunger 16 of the pressure dial which is usually a rotary member will have associated with it during the initial treatment of the assembled crowns, a suitable heating means such as will act to evaporate any objectionable moisture or dry the adhesive or adhesives. In other words, during the movement of the cap in the pressure dial, and preferably during the initial portion of its movement, a suitable temperature and pressure will be available to vaporize any excessive moisture or set the adhesive.

Also, the pressure plunger 15 may be suitably heated to assure the evaporation and removal of any excess moisture and maintain the adhesive tacky, the remaining devices with which the cap is treated being maintained unheated. If desired, the punch may be used to impart heat to the assembled cap during its contact therewith, as by maintaining the punch heated notwithstanding that a heated pressure plunger 15 is also utilized.

Again the crown having the cushion therein may be pre-heated, or the cushion itself alone pre-heated, so that upon application of the spot, the temperature and pressure are sufficient to remove any moisture present and insure adherence of the spot to the cushion instantly upon its deposit. Thereafter, the instrumentalities to which the cap is subjected will be unheated, although, of course, if necessary, a heated plunger 15 may be used or a heated pressure dial 16 as described.

Ordinarily, the moisture present on the foil is negligible in quantity but effective for the purposes desired, so that aside from the heat treatment of the spotting material initially in the tank 17, the remaining devices may be operated in unheated condition. If only a lubricating film is applied to the strip, it is desirable to heat the cushion in the shell before deposit of the spot, in order to insure instant adherence of the spot to the cushion when it engages the latter. Moreover, if the liquid bath is heated, it is frequently desirable to supplement the effect of the heated liquid on the strip by preheating the cushion liners. In some cases, it may be also desirable to employ the heated plunger after the punch.

I have described the several modifications in order that a practical understanding of the invention may be had.

It should be observed that when the liquid is sufficiently heated the strip spotting material is treated prior to the punching operation to render the adhesive layer 13 tacky and that this tacky condition is retained during the punching operation and the subsequent operation with the pressure plunger 15, so that a complete and coextensive adhesion of the spot with the cushion liner is assured. The presence of a thin film of lubricant, for example water, aids materially in the punching operation, in that the punch does not stick to the strip nor do the spots sick to the punch and a clean cut spot is punched out.

In Figure 6, I have illustrated a conventional spot crown having a shell 22 wherein the spot 23 is affixed to a cushion liner 21 of natural cork or composition cork and, as will be observed, is of smaller diameter than the cushion liner.

If desired, the pressure plunger may be eliminated and the cap formed by means of the punching instrumentality and the pressure dial; again, the pressure dial may be eliminated and the punch and pressure plunger constitute the two instrumentalities for forming the cap.

Where the spot adhesive is made tacky by moisture or water, the several devices may be unheated, or heated should the adhesive be of the heat hardened type.

Where the adhesive for the cushion and shell is of a cold hardened or heat hardened type, the instrumentalities will be heated or unheated as required. In this connection, it will be observed that the pressure dial may be utilized to accomplish the hardening of the heat hardened spot or liner adhesives or may be unheated to accomplish the hardening of the cold hardened adhesives.

I claim:

1. The method of center spotting caps comprising a metal shell, a cushion liner, and a spot facing which comprises continuously treating strip spotting material having a facing layer of metal foil and a layer of normally non-tacky, thermoplastic adhesive with a heated liquid to render the adhesive tacky and the strip lubricating to a punch, punching spots successively from said strip, and positioning each spot in a shell and in adhesive union with a cushion liner therein.

2. The method of center spotting caps comprising a metal shell, a cushion liner, and a spot facing which comprises continuously passing strip spotting material having a facing layer of metal foil and a layer of normally non-tacky, thermoplastic adhesive through a bath of heated liquid inert with respect to said spotting material to render the adhesive tacky, punching out the spots from said strip, and positioning each spot in a shell and in adhesive union with a cushion liner therein.

3. The method of center spotting caps comprising a metal shell, a cushion liner, and a spot facing which comprises continuously passing strip spotting material comprising a facing layer and a layer of normally non-tacky, thermoplastic adhesive through a heated bath comprising an inert and punch lubricating liquid to render the adhesive tacky, punching out the spots from said strip, and positioning each spot in a shell and in adhesive union with a cushion liner therein.

4. The method of spotting center spot caps comprising a metal shell, a cushion liner therein and a facing of less diameter than the liner adhesively united thereto by a stratum of thermoplastic adhesive which comprises feeding a strip of spotting material having a layer of thermoplastic adhesive thereon, applying a moistening and lubricating film to the strip, rendering the adhesive tacky and successively punching spots from the moistened strip and uniting the spots to the liner under pressure and while said adhesive is in tacky state.

5. The method of spotting center spot caps comprising a metal shell, a cushion liner therein and a facing of less diameter than the liner adhesively united thereto by a stratum of thermoplastic adhesive which comprises feeding a strip of spotting material having a layer of thermoplastic adhesive thereon, heating the strip to render the adhesive tacky and applying a moistening film thereto, punching spots from the strip and uniting the spots to the liners under pressure.

6. The method of center spotting caps comprising a metal shell, a cushion liner and a facing of less diameter than the liner adhesively united thereto by a stratum of thermoplastic adhesive which comprises feeding a strip of spotting material having a layer of thermoplastic adhesive thereon, applying a moistening and lubricating film to the strip, successively punching spots from the moistened strip, heating the liners in the caps and uniting the spots to the heated liners by the combined action of heat and pressure.

7. The method of center spotting caps comprising a metal shell, a cushion liner and a facing of less diameter than the liner adhesively united thereto by a stratum of thermoplastic adhesive which comprises feeding a strip of spotting material having a layer of thermoplastic adhesive thereon, heating the strip to render the adhesive tacky and applying a moistening film thereto, punching spots from the strip, heating the liners in the caps, and uniting the spots to the heated liners by the combined action of heat and pressure.

8. The method of center spotting caps comprising a metal shell, a cushion liner and a facing of less diameter than the liner adhesively united thereto by a stratum of thermoplastic adhesive which comprises feeding a strip of spotting material having a layer of thermoplastic adhesive thereon, applying a moistening and lubricating film to the strip, successively punching spots from the moistened strip, heating the liners in the caps, depositing the cut spots upon the heated liners, subjecting the united spots and liners to the combined action of heat and pressure, and thereafter permitting the liners to cool while under pressure.

9. The method of center spotting caps comprising a metal shell, a cushion liner and a facing of less diameter than the liner adhesively united thereto by a stratum of thermoplastic adhesive which comprises feeding a strip of spotting material having a layer of thermoplastic adhesive thereon, applying a moistening and lubricating film to the strip, heating the strip to render the adhesive tacky, successively punching spots from the moistened strip, heating the liners in the caps, depositing the cut spots upon the heated liners, subjecting the united spots and liners to the combined action of heat and pressure, and thereafter permitting the liners to cool while under pressure.

10. The method of center spotting caps comprising a metal shell, a cushion liner and a facing of less diameter than the liner adhesively united thereto by a stratum of thermoplastic adhesive which comprises feeding a strip of spotting material having a layer of thermoplastic adhesive thereon, applying a moistening and lubricating film to the strip, heating the strip to render the adhesive tacky by maintaining the liquid at a temperature sufficiently high to soften the adhesive, successively punching spots from the moistened strip, heating the liners in the caps, depositing the cut spots upon the heated liners, subjecting the united spots and liners to the combined action of heat and pressure, and thereafter permitting the liners to cool while under pressure.

11. The method of spotting center spot caps comprising a metal shell, a cushion liner therein and a facing of less diameter than the liner adhesively united thereto by a stratum of thermoplastic adhesive which comprises feeding a strip of spotting material having a layer of thermoplastic adhesive thereon, continuously applying a lubricating film to the strip and rendering the adhesive tacky by passing the same through a moistening and softening bath, successively punching spots from the moistened strip and uniting the spots to the liners under pressure.

12. The method of spotting center spot caps comprising a metal shell, a cushion liner therein, and a facing of less diameter than the liner adhesively united thereto by a stratum of thermoplastic adhesive which comprises feeding to a punching instrumentality a continuous strip of spotting material having a layer of thermoplastic adhesive thereon, heating the strip as it is fed to the punching instrumentality and at a point in advance thereof sufficiently to render the adhesive tacky, punching spots from the strip over the metal shells while the adhesive is still tacky, whereby the punching operation deposits the formed spots, supplying additional heat to the adhesive at the instant the formed spots are deposited and uniting the spots to the liners under pressure.

13. The method of center spotting caps comprising a metal shell, a cushion liner and a facing of less diameter than the liner adhesively united thereto by a stratum of thermoplastic adhesive which comprises feeding a continuous strip of spotting material having a layer of thermoplastic adhesive thereon, heating the strip as it is fed to a punching instrumentality and at a point in advance thereof sufficiently to render the adhesive tacky, punching spots from the strip over the metal shells while the adhesive is still tacky, heating the liners in the caps and uniting the spots to the heated liners by the combined action of heat and pressure.

ANTOINE LEENAARDS.